United States Patent [19]

Bourset et al.

[11] Patent Number: 4,879,072

[45] Date of Patent: Nov. 7, 1989

[54] METHOD OF MANUFACTURING NATURAL PROTEIN POLYMER CONTACT LENSES BY MOLDING AND CROSS-LINKING

[75] Inventors: Claude Bourset, Creteil; Georges Wajs, Ivry, both of France

[73] Assignee: Essilor International Cie Generale d'Optique, Cretiel, France

[21] Appl. No.: 215,502

[22] Filed: Jul. 6, 1988

[30] Foreign Application Priority Data

Jul. 7, 1987 [FR] France .................. 87 09619

[51] Int. Cl.$^4$ ............................................. B29D 11/00
[52] U.S. Cl. ............................... 264/1.4; 264/2.6; 264/26
[58] Field of Search .................... 264/1.4, 2.6, 26

[56] References Cited

U.S. PATENT DOCUMENTS

| | | | |
|---|---|---|---|
| 4,211,384 | 7/1980 | Bourset et al. | 249/160 |
| 4,223,984 | 9/1980 | Miyata et al. | 264/1.4 |
| 4,264,493 | 4/1981 | Battista | 260/117 |
| 4,349,470 | 9/1982 | Battista | 264/1.1 |
| 4,416,814 | 11/1983 | Battista | 264/1.1 |
| 4,495,117 | 1/1985 | Feurer et al. | 264/1.4 |
| 4,568,262 | 2/1986 | Feurer | 425/174 |
| 4,650,616 | 3/1987 | Wajo | 264/2.6 |

FOREIGN PATENT DOCUMENTS

| | | |
|---|---|---|
| 0003695 | 9/1981 | European Pat. Off. . |
| 0011523 | 7/1982 | European Pat. Off. . |
| 0089705 | 9/1983 | European Pat. Off. . |
| 1543765 | 10/1968 | France . |
| 2477059 | 9/1981 | France . |
| 2565160 | 3/1987 | France . |
| 2586703 | 3/1987 | France . |
| 602126 | 10/1946 | United Kingdom . |
| 1168173 | 10/1969 | United Kingdom . |

OTHER PUBLICATIONS

Patent Abstracts of Japan, vol. 8, No. 143, (M–306) [1580], Jul. 4, 1984 & Japanese Patent Application No. 59–41231 (Hitachi Seisakusho K.K.) 07.03.1984.

*Primary Examiner*—James Lowe
*Attorney, Agent, or Firm*—Charles E. Brown; Charles A. Brown

[57] ABSTRACT

In this method of manufacturing a flexible contact lens from a protein biological material, such as a protein polymer of the gelatine type or a type IV enriched human collagen, a hydrogel is first made by hydrating the protein biological material, in water or a physiological serum. A lens preform is then made from the hydrogel at a temperature between ambient temperature and the temperature at which the material liquefies, at which temperature the hydrogel has a paste-like consistency. This preform, which reproduces the shape of the finished lens with a greater or lesser degree of accuracy, but always with excess material, is then placed in a mold made from a low-loss dielectric material. The mold is in at least two parts which, when locked together, define a three-dimensional shape and a finished lens surface state. The hydrogel is then liquefied by irradiating the mold with an electromagnetic field at a frequency between $10^8$ and $10^{10}$ Hz. The parts of the mold are then locked together and the hydrogel is then gelified by cooling it in the mold. Finally, the hydrogel is then removed from the mold and is cross-linked by contact with a cross-linking agent such as an aldehyde. The resulting lenses have excellent shape and surface state characteristics and are very well tolerated biologically.

11 Claims, No Drawings

METHOD OF MANUFACTURING NATURAL PROTEIN POLYMER CONTACT LENSES BY MOLDING AND CROSS-LINKING

BACKGROUND OF THE INVENTION

1. Field of the invention

The invention concerns a method of manufacturing a flexible contact lens from a protein biological material in which a hydrogel is made by hydrating the protein polymer, a determined quantity of the hydrogel is enclosed in the cavity of a mold in at least two parts adapted to define, after its parts are locked to each other, a three-dimensional shape with a finished lens surface state, the hydrogel being liquefied at a temperature higher than 50° C., then gelified by cooling in the mold, after which the gel is cross-linked by contact with a cross-linking agent.

2. Description of the prior art

Patent document EP-A No. 0 011 523 describes natural protein polymers of vegetable or animal origin, in particular of the type known as gelatines, having a molecular weight between 10 000 and 100 000 adapted to be swelled by water to form hydrogels with a hydration factor between 0.3 and 10.

Use of these natural protein polymers entails the formation of hydrogels (usually called solutions) containing from 0.5 to 15% by weight of proteins or a mixture of proteins as a result of swelling in water or an aqueous solution, heating the hydrogels to 60°±5° C. until they are homogeneous and limpid, and adjusting the pH to between 3.5 and 5.5 approximately. A tanning agent such as ammoniacal iron alum may be added to improve the stability of the hydrogel. Then, while the hydrogel is held at the previous temperature, there is added to it a cross-linking agent such as formaline (37% formaldehyde solution) in a quantity between 0.5 and 15% by weight, the fluid hydrogel is cast in an appropriate mold until the end of cross-linking, and then the lenses removed from the mold are cooled in air at a temperature of not more than 35° C. until the moisture content is below 10%.

If the cast lens is colored, it can be bleached by means of oxidizing agents such as oxygenated water.

Patent document FR-A No. 2 586 703 describes a method of extracting gelified placental collagens also suitable for preparing contact lenses, these collagens being of the type IV enriched kind: their use is very similar to that of the hydrogels as per EP-A No. 0 011 523. However, collagen hydrogels liquefy at temperatures lower than gelatine hydrogels.

It will be noted that an essential benefit of using natural protein hydrogels is their biocompatibility, of decisive importance in tolerance by the wearer: from this point of view human or animal placental collagens show a very remarkable biocompatibility with respect to human and animal organisms, respectively, in the kind in question. Of course, for contact lens applications human placental collagens will preferably be used.

Patent document FR-A No. 2 565 160 describes a method of manufacturing flexible contact lenses from protein polymer of the kind defined in document EP-A No. 0 011 523, in which method a protein polymer hydrogel is placed in a two-part mold at a liquefaction temperature of about 60° to 80° C., at which the hydrogel flows, gelification is brought about by cooling the mold, and the lens is extracted from the mold and placed in contact with a mixture of solvents chosen to avoid degradation of the gelified hydrogel, this mixture containing a cross-linking agent such as an aldehyde; the cross-linking agent diffuses into the gelified hydrogel and renders it insoluble. The lens is then washed and placed in a preserving solution.

It will be understood that the process as per FR-A No. 2 565 160 whereby the lens is shaped simply by gelifying the hydrogel by cooling the mold authorizes a hydrogel "shelf life" (before it is cast) significantly higher than that resulting from the process as per EP-A No. 0 011 523, in which the hydrogel contains the cross-linking agent before it is cast. It should be borne in mind that the "shelf life" of a polymerizable mixture intended for manufacture of articles is the time that elapses between the preparation of the mixture and the time where polymerization is too far advanced for shaping it to be possible.

However, maintaining the hydrogel at the casting temperature for long periods has a number of disadvantages: at the casting temperature the rate of degradation of the protein polymer is not negligible, with modification of the rheological properties of the hydrogel affecting the casting, and a risk of more rapid degradation of the finished contact lenses; also, at the casting temperature there is already significant evaporation of the water constituting the hydrogel, and the viscosity of the hydrogel varies rapidly as a function of the water content; the quality of the casting process depends to a very great degree on the viscosity of the hydrogel. Of course, the casting temperature cannot be reduced in order to reduce the rate at which the hydrogel changes without compromising the quality of casting, together with the reproducibility of the quantity of hydrogel placed in the molds; on this latter topic, it will be remembered that the quantity of hydrogel placed in a mold is determined by the number of drops deposited and that the mass of a drop depends on the surface tension of the hydrogel, which varies rapidly with temperature.

SUMMARY OF THE INVENTION

The invention consists in a method of manufacturing a flexible contact lens from a protein biological material wherein a hydrogel is made by hydrating said protein biological material, a lens preform is then made from said hydrogel at a temperature between ambient temperature and the temperature at which said material liquefies, said preform is then placed in a mold made from a low-loss dielectric material and in at least two parts which, when locked together, define a three-dimensional shape and a finished lens surface state, said hydrogel is then liquefied by irradiating said mold by means of an electromagnetic field at a frequency between $10^8$ and $10^{10}$ Hz, said parts of said mold are then locked together, said hydrogel is then gelified by cooling in said mold and said hydrogel is then cross-linked by contact with a cross-linking agent.

It is well known that polar substances, and in particular those which contain water, absorb strongly electromagnetic energy at high frequencies, especially in the range specified hereinabove. The hydrogel when enclosed in a mold and irradiated in an electromagnetic field of this kind will therefore be raised to the liquefaction temperature before the temperature of the mold itself increases significantly, partly by virtue of the low dielectric losses to which it is inherently subject and partly due to the relatively slow rate at which heat diffuses from the hydrogel as its temperature rises into the mold. Immediately the electromagnetic irradiation is halted, the hydrogel will then begin to cool in contact with the parts of the mold; also, locking the mold has the effect of pressing the hydrogel against the walls of the mold and therefore of improving the contact between the hydrogel and the mold. During the process of shaping the contact lens, the hydrogel is therefore held at the liquefaction temperature for only a very short time, so that its composition and its properties vary at only a very slow rate during the manufacture of the consecutive contact lenses of a batch.

Also, variations in the temperature of the mold during the manufacturing cycle lie between closely spaced limits either side of ambient temperature, and in particular the maximum temperature is not high. Because of this, there is virtually no irreversible variation in the shape of the molds (through release of internal stresses, for example), which is highly beneficial given the close dimensional tolerances that are necessary for correct manufacture of contact lenses.

It will be realised that, going against what might have been expected because of hysteresis and anisotropic behavior of hydrogels subject to rapid variations of temperature in the liquefaction cycle, the lenses removed from the molds have excellent dimensional, mechanical and optical qualities.

It will be noted that it has previously been proposed to induce cross-linking of a polymer by high-frequency irradiation in a flexible contact lens mold; thus patent document FR-A No. 2 477 059 describes the cross-linking of grafted vinyl or acrylic monomers. However, this is an application of heating by dielectric losses, the objective of which is radically different than that of the present invention.

According to the just mentioned document, the polymerizable material has to contain a heat sensitive polymerization catalyst before it is placed in the molds, which necessarily limits the "shelf life" of the mixture. Also, proper execution of polymerization requires irradiation times of at least one hour, to control the risk of overheating. By contrast, with the present invention the result of heating is temporarily to confer on the hydrogel sufficient fluidity to obtain an excellent surface state and final shaping. The heating time will typically be in the order of one half-minute. Moreover, the irradiation does not cause any exothermic phenomena and therefore remains controlable.

The frequency of the electromagnetic field will preferably be approximately 2.45 GHz in a frequency band assigned to the use of electromagnetic energy for heating purposes, for which generators are readily available.

The liquefaction temperatures are preferably in the ranges employed for casting hydrogels in the current state of the art, that is 50° to 80° C.

The preferred protein polymers are either the gelatine type as per EP-A No. 0 011 523 or the type IV enriched collagen as per FR-A No. 2 586 703. It will be noted that the liquefaction temperatures of gelatines are generally between 70° and 80° C. whereas those of collagens are rather between 50° and 60° C.

The intensity of the electromagnetic field is preferably adjusted to a value such that the liquefaction temperature is reached after an irradiation time between 5 and 45 seconds, or better still between 10 and 30 seconds.

It will be understood that the temperature cannot be measured directly because of the small mass of the lenses and because of the environment during heating. Reproducibility of the results of molding is therefore closely related to the reproducibility of the heating parameters (intensity and duration), determined beforehand by experiment.

If the heating of the hydrogel were strictly adiabatic, the liquefaction temperature would be obtained when the hydrogel contained in the mold had absorbed a particular amount of energy; also, the temperature of the mold would not vary significantly and cooling after locking would be obtained under optimum conditions. This is why a maximum heating time is defined.

However, the shorter the heating time, the more difficult it is to reproduce it accurately; it is therefore beneficial to set a lower duration limit. Also, the loss factor of the hydrogel increases with temperature, like that of most materials; using excessively high energy densities to reduce the heating time would entail the risk of local runaway.

The preform, prepared with hydrogel having a paste-like consistency, may comprise a thin flange surrounding an active area; the weight of the preform can then exceed that of the finished lens by 20 to 40%. The flange facilitates manipulation of the fragile preform, and is eliminated during the molding stage.

It is also possible to make a plate of hydrogel the thickness of which is near the maximum thickness of the lens and to cut out from this plate circles which constitute preforms.

It is also possible to make the preform with a volume that is substantially equal to that of the finished lens, the weight of the preform then not exceeding that of the finished lens by more than 2 to 4%.

The preforms are then more delicate to handle, but wastage of materials is reduced.

Handling of the preforms can be facilitated by providing them on at least one side with a synthetic polymer film which projects beyond the edge of the preform all around it and is adapted to adhere less strongly to the mold than to the protein polymer. This film is eliminated before or during the cross-linking stage.

The characteristics and advantages of the invention will emerge from the following description and examples.

DESCRIPTION OF THE INVENTION

The molds used are conventional, for example of the type described in patent document EP No. 0 003 695 with, essentially, a concave part and a convex part which determine between them the shape of the contact lens and its radii of curvature; the periphery of the concave part is of frustoconical shape to define the bevel at the edge of the lens and its edge is sharp to cut off the excess material from the edge of the lens.

A skirt system on one mold part is a friction fit over a cylindrical area on the other part. The mold parts are pressed towards each other until contact occurs at the edge of the cavity which determines the shape of the lens and the mold is then locked onto the closely confined lens.

The molds are made from a low-loss dielectric material, for example polyamide (RILSAN (R)), injection-molded polycarbonate or polypropylene.

For the molding and locking operations the preforms are loaded onto one mold part and the other part is fitted to the first, without forcing it. The molds are then placed between the plates of a portable hydraulic or pneumatic press made entirely from low-loss dielectric materials. The press is placed in a microwave oven, the operating parameters are adjusted and electromagnetic energy is applied for a predetermined duration. When the heating is terminated, fluid pressure is applied to the press so as to lock the molds.

Alternatively, the molds are placed in an assembly comprising two low-loss dielectric material plates, between the plates. After heating, this assembly is placed between the plates of any kind of press, for locking the molds.

The molds are then transferred into an enclosure cooled to approximately 4° C. so that the hydrogel gelifies to a sufficiently firm consistency for the lenses to be removed from the molds and then cross-linked by contact with a cross-linking agent, for example by the process as described in FR-A-2 565 160; they can then be cross-linked in the vapor phase.

It should be noted that the operations which follow on from molding are known in themselves, so that no detailed description of them is needed here.

EXAMPLE 1: Preparing a gelatine hydrogel 100 g of powdered gelatine was swelled in 400 ml of deionized water for a period of 2 to 11 hours (molecular weight: approximately 50 000; opalescence: 225). The mixture was then heated to 60°±5° C. for 30 minutes to homogenize it. The hydrogel produced, with a paste-like consistency, was cast into preforms in the molds.

Samples were used to determine the liquefaction temperature, which was around 70° to 80° C.

Two types of preform were used during the tests.

Some had a central area substantially the same shape as the finished lens and an annular flange approximately 0.3 mm thick; they were made by injection-molding, in a mold having a shape complementary to that of the preform, a quantity of hydrogel the weight of which exceeded that of the finished lens by 20 to 40%, averaging 30%.

The others were made in substantially the same shape as the finished lens; a quantity of hydrogel exceeding in weight that of the finished lens by 2 to 4%, averaging 3%, was injected into a mold similar to the finished lens molds.

The preforms obtained can be used immediately after removal from the mold. Otherwise, they are vacuum-packed in cells in plates of polymer material covered by a welded-on or bonded-on closure film and stored at approximately 4° C.; this protects the packaged preforms against dehydration.

Of course, the swelling water may have added to it agents for stabilizing the pH and the gelling ability; 4 g of ammoniacal iron alum can be added, for example.

EXAMPLE 2: Molding the lenses

Preforms prepared as in Example 1 were placed in the finished lens molds, as described above, and these molds were placed between the plates of a portable press, also as described previously. The press and the loaded molds were placed in a 2.45 GHz microwave oven.

The oven was adjusted to deliver an electromagnetic power of 500 W and this power was applied to the molds for 30 seconds.

On completion of irradiation, fluid under pressure was applied to the press to lock the molds. The latter were then removed from the oven and placed in an enclosure cooled to approximately 4° C.

When the molds had assumed an overall temperature of 4° C., the lenses were removed carefully from the molds and then cross-linked by the process described in FR-A No. 2 565 160.

EXAMPLE 3: Molding the lenses

Preforms prepared as in Example 1 were placed in the molds and the molds were placed in a press and the whole was placed in a microwave oven, as in Example 2.

The power was adjusted to 700 W and the heating time set to staggered values between 5 and 20 seconds, with the best results obtained at around 15 seconds.

The lenses were pressed, cooled and cross-linked as in Example 2.

EXAMPLE 4: Preparing a collagen hydrogel

Type IV enriched human placental collagen prepared as taught in FR-A No. 2 586 703 was taken in dried fiber form.

15 g of collagen powder was placed to swell in 85 ml of physiological serum (deionized water containing 9 g/l of NaCl) for between 2 and 15 hours.

After swelling was complete, the mixture was raised to a temperature between 20° and 45° C., typically 30° C., for 30 minutes to homogenize it.

The limpid hydrogel obtained was poured onto a flat plate and spread with a scraper to form a layer with a regular thickness of 0.5 mm. The liquefaction temperature was between 50° and 60° C.

The plate was then placed in an enclosure cooled to approximately 4° C. When it had substantially reached its equilibrium temperature, the gelified hydrogel plate was peeled off and preforms were cut out from the plate, in the form of disks 15 to 20 mm in diameter.

Once again, the plates can be used immediately for molding contact lenses, or vacuum-packed in cells of a plate covered with a bonded-on film and stored at 4° C.

EXAMPLE 5: Molding the collagen lenses

The preforms obtained as in Example 4 were placed in molds and the latter placed between the plates of a press, under the same conditions as for Examples 2 and 3.

The electromagnetic power applied at 2.45 GHz was 500 W. The heating times were staggered between 5 and 30 seconds, the best results having been obtained at around 20 seconds.

On completion of the manufacturing process, the lenses obtained proved to be particularly well tolerated biologically.

It will be appreciated that in the method of the invention in which the molds are not preheated before the hydrogel is poured into them and where the raising of the hydrogel to the liquefaction temperature raises the mold temperature only slightly, the molds are subject to temperature cycles with a minimum around 4° C. and a maximum below 35° C. Under these conditions the molds are subject to virtually no irreversible changes in shape, in particular through release of internal stresses. Thus the method of the invention provides for precise determination of the three-dimensional shape of the finished lenses, and can extend the service life of the molds.

However, it should be noted that the operations extending from removal of the lens, which has its final shape, from the mold to execution of the cross-linking remain delicate because of the fragile nature of the hydrogels before cross-linking and because of specific requirements in terms of absence of deformation and erosion of the lens surfaces.

The preforms, preferably of the type whose volume is substantially the same as that of the future finished lens, may therefore be provided with a synthetic polymer film placed onto one or both surfaces of the preform, projecting beyond its edge. The synthetic polymer may be a polyvinyl alcohol, for example. This coating may be made by spraying the polymer into a solvent, the thickness of the film deposited being between 5 and 50 µm.

This film protects the optical surfaces of the lens from contact with the mold during liquefaction of the hydrogel and during removal of the lens from the mold, because the film adheres less strongly to the mold than to the hydrogel. Moreover, this film will disappear before or during the cross-linking stage, either because it is eliminated before cross-linking or because it dissolves in the medium containing the cross-linking agent.

The invention is of course not limited to the examples described, but encompasses all variant executions thereof within the scope of the claims.

We claim:

1. Method of manufacturing a flexible contact lens from a protein biological material wherein a hydrogel is made by hydrating said protein biological material, a lens preform is then made from said hydrogel at a temperature between ambient temperature and the temperature at which said material liquefies, said preform is then placed in a mold made from a low-loss dielectric material and in at least two parts which, when locked together, define a three-dimensional shape and a finished lens surface state, said hydrogel is then liquefied by irradiating said mold by means of an electromagnetic field at a frequency between $10^8$ and $10^{10}$ Hz, said parts of said mold are then locked together, said hydrogel is then gelified by cooling in said mold and said hydrogel is then cross-linked by contact with a cross-linking agent.

2. Method according to claim 1, wherein the frequency of said electromagnetic field is approximately 2.45 GHz.

3. Method according to claim 1, wherein said hydrogel liquefies at a temperature between 50° and 80° C.

4. Method according to claim 1, wherein said protein biological material is of the gelatine type.

5. Method according to claim 1, wherein said protein biological material is a type IV enriched collagen.

6. Method according to claim 1, wherein the intensity of said electromagnetic field is controlled so that the liquefaction temperature of said hydrogel is reached after a total duration of between 5 and 45 seconds.

7. Method according to claim 6, wherein said total duration is between 10 and 30 seconds.

8. Method according to claim 1, wherein said preform is made with a flange surrounding an active area corresponding to the finished lens, the weight of said preform exceeding that of said finished lens by 20 to 40%.

9. Method according to claim 1, wherein said preform is made by cutting a circle from a plate of hydrogel the thickness of which is near the thickness of the finished lens, the volume of said preform exceeding that of said finished lens.

10. Method according to claim 1, wherein said preform is made with substantially the same volume as the finished lens, the weight of said preform exceeding that of said finished lens by 2 to 4%.

11. Method according to claim 10, wherein said preform has on at least one side a synthetic polymer film which extends beyond the edge of said preform all round said preform, is adapted to adhere less strongly to said mold than to said protein biological material and is eliminated before or during the cross-linking stage.

* * * * *